Patented Apr. 21, 1931

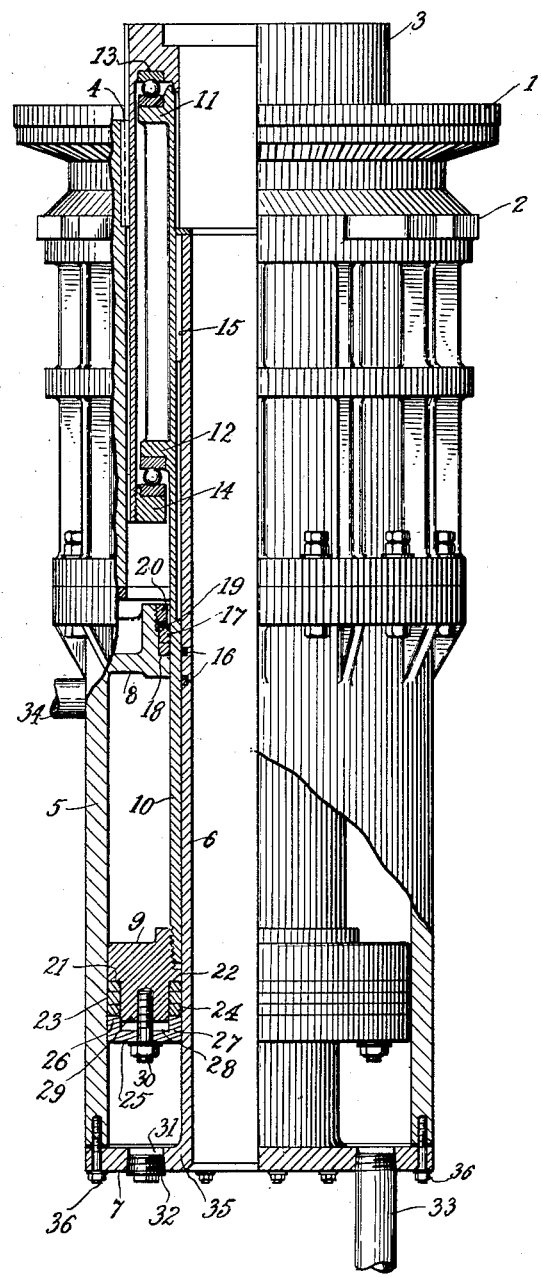

1,801,391

UNITED STATES PATENT OFFICE

WALDO SHELDON, OF SOUTH NORWALK, CONNECTICUT, ASSIGNOR TO SHELDON MACHINERY CORPORATION, OF NEW YORK, N. Y., A CORPORATION OF NEW YORK

WELL-DRILLING APPARATUS

Original application filed May 5, 1926, Serial No. 106,850. Divided and this application filed July 24, 1928. Serial No. 294,974.

This invention relates particularly to power feed rotary drills of the type disclosed in United States patent application 106,850, filed May 5, 1926 of which the present case is a division.

Special objects of the invention are to improve the power cylinder structure so as to enable the piston packing to be adjusted without taking off the cylinder head and to accomplish the attainment of this result in a simple and practical manner.

The various novel features of the invention will appear in the course of the following specification.

The drawing accompanying and forming part of the specification illustrates one of the practical commercial embodiments of the invention, but it should be understood that the structure may be modified without departure from the true spirit and basic scope of the invention as covered broadly in the claims.

The single figure in the drawing is a side elevation and part broken vertical sectional view of a rotary power feed drill having the invention incorporated therein.

In the illustration, the table of the rotary is shown at 1 journalled in a base structure 2 and having a drive sleeve 3 keyed therein at 4. This drive sleeve carries the drill pipe grips and other devices (not shown) and is raised and lowered by the piston of the power cylinder.

The power cylinder is shown as of annular construction made up of outer and inner cylinder walls 5 and 6 connected at the bottom by a cylinder head 7 and closed at the top by a cylinder head 8.

Operating within the annular cylinder space is a piston of annular form and shown as made up of an annular head 9 connected with a sleeve 10, which forms an annular piston rod operating up past the upper cylinder head and carrying the upper and lower thrust bearings 11, 12 engaging the upper and lower thrust bearings 13, 14 of the drive sleeve.

The piston is shown as being keyed against rotation in the cylinder by a long key 15 between the inner face of the annular piston rod and the outer face of the inner cylinder wall. Packing rings 16 are indicated between the outer face of the inner cylinder wall and the oversliding wall of the annular piston rod and compressible packing rings 17 of substantially rectangular cross-section are shown seated in an open sided cavity 18 in the upper piston head where they may be expanded inwardly against the outer face of the annular piston rod by an overlying thrust ring 19 engaged by a take up ring 20 screwed in the upper portion of this packing cavity.

The annular piston head is shown as having outwardly and inwardly opening seats 21, 22 containing compressible packing rings 23, 24 of substantially rectangular cross-section and borne upon by an expander ring 25 of substantially U-cross-section and having annular ribs 26, 27 bearing upon the outer and inner packing rings. The annular cavity 28 of this expander fits over the intermediate annular rib 29 of the piston head, so that the expander can be moved toward the head to expand the inner and outer sets of packing rings. To accomplish this last result, bolts 30 are shown extending through the expander into the body of the piston head, and in order that access may be had to these bolts while the machine is assembled, ports 31 are provided in the lower cylinder head in line with these expander bolts, which ports are normally suitably closed as by means of plugs 32 or pipe 33, the latter being utilized for admission and exhaust of operating fluid to and from the lower end of the cylinder. A pipe connection is indicated at 34 for admission and exhaust of operating fluid to and from the upper end of the cylinder, above the piston head.

The piston is held against turning in the cylinder, so that the expander bolts remain in line with the por'.· in the cylinder head. The piston packing therefore may be adjusted for wear at any time by simply opening up these ports and setting up the expander bolts as much as may be required. The power cylinder is detachably mounted or supported from the base as indicated, so that if at any time the upper cylinder head packing may require adjustment, the power cylinder may be detached and the proper adjustment be effected by setting up the adjustable upper packing expander.

The lower cylinder head may have a screw connection or be integral with the inner cylinder wall at 35 and as being secured to the outer cylinder wall by bolts 36 so that upon removal of the latter, this lower cylinder head with the inner cylinder wall may be lowered or withdrawn to give full access to the piston for the purpose of replacing the piston packing rings or the like.

It will be noted that the transversely U-shaped expander ring arches over the end of the piston body forming a flat piston head for the pressure fluid to act on and that because of its engagement with both the inside and the outside piston packings, simultaneous adjustment of these packings is effected when the expander ring is adjusted.

What is claimed is:

1. In apparatus of the character disclosed, an annular cylinder, an annular piston operating in said annular cylinder, packing for said annular piston, an annular expander for said packing, bolts on said annular piston for adjusting said annular packing expander, said annular cylinder having passages in line with said bolts for exposing said expander adjusting bolts to external operation, readily removable closures for said passages and means for keying the annular piston against rotation in the annular cylinder, whereby to maintain the alignment of said expander adjusting bolts with the passages aforesaid.

2. In apparatus of the character disclosed, an annular power cylinder, an annular piston operating in said cylinder and having packing seats at the outer and inner sides of the same, expansible packing rings in said seats, an expander ring of substantially U-cross-section extending over the end of the piston and engaging the packing rings and means for adjusting said expander toward the piston head to thereby simultaneously expand both the outer and inner packing rings.

3. In apparatus of the character disclosed, an annular power cylinder, an annular piston operating in said cylinder and having packing seats at the outer and inner sides of the same, expansible packing rings in said seats, an expander ring of substantially U-cross-section extending over the end of the piston and engaging the packing rings, means for adjusting said expander toward the piston head to thereby simultaneously expand both the outer and inner packing rings, said expander adjusting means being disposed at the end of the piston structure and the annular cylinder having an end head with a passage to expose said expander adjusting means for external manipulation.

4. A combination as in claim 3, in which the expander adjusting means comprise a plurality of bolts and in which there are plural passages in the cylinder head in line with said bolts, said passages being normally closed but readily accessible for the purpose of adjusting the bolts.

In testimony whereof I affix my signature.

WALDO SHELDON.